Oct. 7, 1924.
J. F. BOLGIANO
1,511,156
TRANSMISSION MECHANISM
Filed March 21, 1923
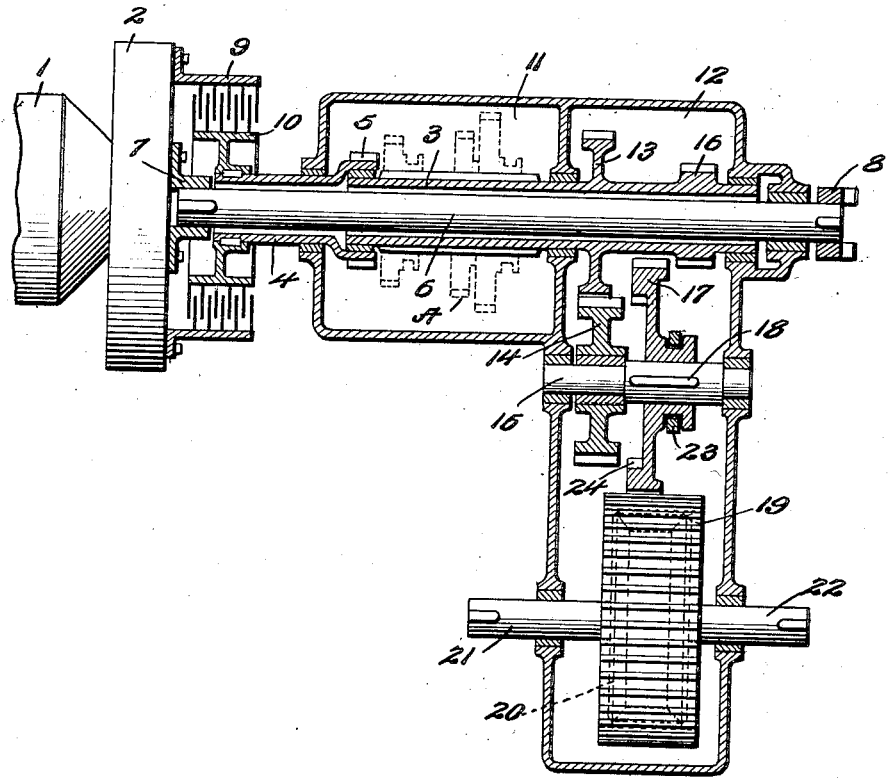
Inventor
John F. Bolgiano,
By Robert H. Young
Attorney Patented Oct. 7, 1924.

1,511,156

UNITED STATES PATENT OFFICE.

JOHN F. BOLGIANO, OF DAYTON, OHIO.

TRANSMISSION MECHANISM.

Application filed March 21, 1923. Serial No. 626,541.

*To all whom it may concern:*

Be it known that I, JOHN F. BOLGIANO, a citizen of the United States, residing at Dayton, in the county of Montgomery and State of Ohio, have invented certain new and useful Improvements in Transmission Mechanism, of which the following is a specification.

This invention relates to transmission mechanism and is capable of being used in various ways and for different purposes.

The object of the invention is to provide mechanical means to transmit power from an engine or other source of power, for example to the driving wheels of a motor vehicle and also to any other mechanism such as a winch. The mechanism herein shown and described is designed with special reference to the driving of a winch used for paying out and hauling in the cable of a captive balloon, the mechanism being of such a character that the traction wheels of the vehicle on which the winch is mounted may be driven either simultaneously with the operation of the winch or independently thereof.

The main feature of the invention resides in the combination and use of two concentric shafts, one of which is tubular and the other of which passes through the tubular shaft, one of said shafts being a part of the driving mechanism of the wheels of the vehicle and the other shaft being used for the purpose of transmitting the power of the engine to the winch or other machine mounted on the motor vehicle.

With the above and other objects in view the invention consists in the novel construction, combination and arrangement herein shown, described and claimed.

The accompanying drawing represents a sectional view of the transmission mechanism taken approximately in line with the transmission shafts and the driving shaft of the vehicle.

Referring to the drawings, 1 designates an engine of any type, and 2 the fly wheel thereof. 3 designates a tubular transmission shaft adapted to be driven by a sleeve 4 carrying the primary gear wheel 5 of the primary transmission, the sleeve enclosing a portion of a power delivery or transmission shaft 6 which is concentric with and passes through the shaft 3 projecting at both ends beyond said tubular shaft 3.

The shaft 6 is connected by a coupling means 7 to the fly-wheel 2 so that it is driven directly thereby and at the same speed therewith. At its opposite end the shaft 6 is provided with clutch means 8 adapting a complemental clutch means on the shaft of the winch or other machine to be connected thereto and disconnected therefrom.

The sleeve 4 which drives the transmission shaft 3 through the primary transmission designated generally at A and being of the conventional type, is in turn driven by the fly-wheel 2 which carries a clutch member 9 cooperating with another clutch member 10 fast on the sleeve 4. The clutch which connects the sleeve 4 to the fly-wheel 2 is shown as of the ordinary multiple disk type, altho any type of clutch may be employed for the purpose. The transmission gearing A is shown as of the sliding gear type and is contained in a compartment 11 of the housing employed to enclose most of the transmission mechanism. The housing comprises another compartment 12 containing auxiliary changeable speed transmission gearing. The auxiliary transmission gearing comprises a gear wheel 13 fast on the shaft 3 and meshing with another gear wheel 14 normally loose on a countershaft 15 parallel to the shafts 3 and 6. Another smaller gear 16 fast on the tubular shaft 3 is adapted to mesh with and drive a gear wheel 17 connected to the shaft 15 by a spline 18. The gear 17 is always in mesh with a wide faced gear 19 forming the outer ring gear member of differential gearing 20 housed within the gear 19 and adapted to drive the sections 21 and 22 of the driving axle of the vehicle.

By means of a shifting fork 23 the gear 17 may be slid along the shaft 15 so as to mesh with the gear 16. The power is then delivered from the shaft 3 through the gears 16 and 17 to the gear 19 and from the gear 19 to the traction wheels of the vehicle. The gear 17 may be shifted toward the gear 14 and is provided with a clutch face 24 adapted to engage the teeth of the gear 14, whereupon the drive is from the shaft 3 through the gears 13, 14 and 17 to the gear 19 and from there through the differential mechanism to the traction wheels of the vehicle. The housing as a whole and including the compartments 11 and 12, is made oil-tight so that all parts of the mechanism may be run in oil or other lubricant. By employing the auxiliary transmission gearing, double the number of speed ratios between the engine and the traction wheels of the vehicle are obtained. The mechanism also permits the transmission of power directly from the engine to a mechanism or unit other than the traction wheels of the vehicle, as for example, a winch for use in connection with a captive balloon. The amount of power required to haul down a balloon is oftentimes greater than the power necessary to propel the vehicle. The power for driving the winch is direct and affords the strongest and most efficient way of transmitting the power from the engine to the winch. Furthermore, the winch and traction wheels of the vehicle may be simultaneously driven or the power of said engine may be delivered to either of said mechanisms independently. It is thus possible for the truck or other motor vehicle to maneuver on the ground while the captive balloon is being hauled down or payed out. The most important feature of the invention resides in the use and arrangement of the two shafts 3 and 6 which are concentric or coaxial and arranged one within the other, the shaft 6 passing entirely through the tubular transmission shaft so as to deliver power directly from the engine through the clutch means 8 to a winch or any other machine or apparatus desired.

I claim:

1. In power transmission, the combination of a source of power, a rotary element driven thereby, variable speed transmission gearing embodying a tubular transmission shaft, clutch means between said tubular shaft and said rotary element, and a power delivery shaft driven by said rotary element and passing axially through said tubular shaft, both power shafts being adapted to deliver power simultaneously.

2. In power transmission, the combination of a source of power, a rotary element driven thereby, variable speed transmission gearing embodying a tubular transmission shaft, clutch means between said tubular shaft and said rotary element, and a power delivery shaft driven by said rotary element and passing axially through said tubular shaft and having driving means at the end thereof beyond the end of the tubular driving shaft, both shafts being adapted to be simultaneously driven.

3. In a motor vehicle, an engine, variable speed transmission gearing embodying a tubular transmission shaft, clutch means between said shaft and engine, driving means between said transmission shaft and the traction wheels of the vehicle, and a power delivery shaft driven by said engine and passing axially through said tubular shaft, said power delivery shaft being permanently and directly connected to said engine.

4. In a motor vehicle, an engine, variable speed transmission gearing embodying a tubular transmission shaft, clutch means between said shaft and engine, driving means between said transmission shaft and the traction wheels of the vehicle, and a power delivery shaft driven by said engine and passing axially through said tubular shaft, said shafts being concentric and both being adapted to be simultaneously driven by said engine.

5. In a motor vehicle, an engine, variable speed transmission gearing embodying a tubular transmission shaft, clutch means between said shaft and engine, driving means between said transmission shaft and the traction wheels of the vehicle, including another variable speed transmission gearing unit, and a power delivery shaft driven by said engine and passing axially through said tubular shaft.

6. In a motor vehicle in combination, an engine, variable speed transmission gearing embodying an engine driven shaft, a large and a small gear thereon, a countershaft, a small gear on said countershaft in mesh with the large gear on the engine driven shaft, a driven shaft, a gear mounted on said driven shaft, and a large gear mounted on said countershaft to rotate therewith and meshing with said gear on the driven shaft and means whereby said large gear on the countershaft may be driven directly either by the small gear on the countershaft or the small gear on the engine driven shaft.

7. The device as set forth in claim 6 wherein the gear on the driven shaft serves as a ring gear for a differential gearing In testimony whereof I affix my signature.

JOHN F. BOLGIANO.